Figure 1:
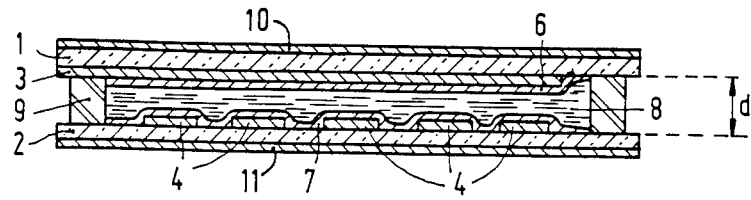

United States Patent [19]

Van Sprang et al.

[11] Patent Number: 4,664,483
[45] Date of Patent: May 12, 1987

[54] LIQUID CRYSTAL DISPLAY DEVICE WITH A HYSTERESIS

[75] Inventors: Hendrik A. Van Sprang; Adrianus J. S. M. De Vaan, both of Eindhoven, Netherlands

[73] Assignee: U.S. Philips Corporation, New York, N.Y.

[21] Appl. No.: 700,205

[22] Filed: Feb. 11, 1985

[30] Foreign Application Priority Data

Feb. 24, 1984 [NL] Netherlands ............... 8400577

[51] Int. Cl.$^4$ .............................................. G02F 1/137
[52] U.S. Cl. .................................. 350/346; 350/350 R
[58] Field of Search ............................. 350/346, 350 R

[56] References Cited

FOREIGN PATENT DOCUMENTS 0098070 6/1983 European Pat. Off. ............ 350/346
2117157 3/1983 United Kingdom .

OTHER PUBLICATIONS

Alt et al "Scanning Limitations of Liquid Crystal Displays" IEEE Trans. on Elec. Devices vol. ED-21, No. 2, Feb. 1974.
Waters, et al "Highly Multiplexed Dyed Liquid Crystal Displays" Proceedings of Japan Display Conf. '83, Kobe, Japan, pp. 396-399.

Primary Examiner—John K. Corbin
Assistant Examiner—David Lewis
Attorney, Agent, or Firm—Paul R. Miller

[57] ABSTRACT

A liquid crystal display device comprises two supporting plates which are kept spaced apart and the facing surfaces of which comprise a pattern of line electrodes and column electrodes, respectively, which form a matrix of display cells. A mixture of a nematic liquid crystal with a cholesteric addition is present between the supporting plates. The mixture has a positive dielectric anisotropy and a natural pitch p such that the ratio d/p has a value between 0.6 and 0.9. The surfaces comprise an orientation layer to provide a progressive molecular twist $\Phi$ of the liquid crystal molecules (director) across the layer thickness d of greater than $1.2\pi$ and less than $1.7\pi$ radians with the director assuming an angle of tilt between 0° and 7° at one surface and an angle of tilt between 5° and 70° at the other surface. Below a field strength $E_1$ the display cells are in a first stable state and above a field strength $E_2$ they are in a second state differing optically therefrom. At a field strength $E_H$ between $E_1$ and $E_2$ both states may co-exist. Starting from the first state and a field strength $E_H$ across the display cells, the liquid crystal material shows a small energy threshold in such manner that a cell can be switched from the first stable state to the second by means of a pulsatory field having an energy content above the energy threshold. With a pulsatory field having an energy content below the energy threshold, the cell returns to the initial state via a metastable state having a certain relaxation period. When the recurrence frequency with which a picture cell is driven does not exceed the reciprocal value of the relaxation period, more than 2,000 lines can be successively written in this manner within one second.

17 Claims, 6 Drawing Figures

LIQUID CRYSTAL DISPLAY DEVICE WITH A HYSTERESIS

The invention relates to a liquid crystal display device comprising two parallel supporting plates which are kept spaced at a distance d and have facing surfaces with a pattern of line electrodes being provided on one surface and a pattern of column electrodes being provided on the other surface in such manner that the line electrodes cross the column electrodes and the crossings form a matrix of picture cells. The display device has between the supporting plates a layer of a nematic liquid crystal with a cholesteric addition, with the liquid crystal having a positive dielectric anisotropy and a natural pitch p and with the ratio d/p having a value between 0.5 and 1. The surfaces comprise an orientation layer to provide a progressive molecular twist $\Phi$ of the liquid crystal molecules (director) across the layer thickness d of greater than $\pi$ and less than $2\pi$ radians, and gives the molecules at one surface an angle of tilt between 0° and 70° and those at the other surface an angle of tilt between 5° and 70° with respect to the surfaces in question. The device upon applying an electric field have picture cells below an effective field strength $E_1$ in a first stable state, above an effective field strength $E_2$ in a second stable state differing optically herefrom and at an effective field strength $E_H$ between $E_1$ and $E_2$ depending on the preceding stable state, which may be either in the first stable state, or in the second stable state.

Such a display device is known from European patent application No. 98070. This known display device is operated in multiplex drive with electric voltages according to the so-called r.m.s.-mode. The manner of driving is described by Alt and Pleshko in I.E.E.E. Trans. El. Dev., Vol. ED 21, 1974, pp. 146–155 and is considered to be the most currently used driving manner for liquid crystal display devices. The maximum number of lines n which can be driven with an acceptable contrast ratio by means of this method is determined by the relationship:

$$N_{max} = [(V_2^2 + V_1^2)/(V_2^2 - V_1^2)]_2$$

wherein $V_2$ is the required r.m.s. voltage across a display cell to switch it in the "on" state, and $V_1$ is the r.m.s. voltage at which the display cell is in the "off" state. If $V_2$ and $V_1$ are closer together, a larger number of lines can be driven, but the time in which the desired contrast ratio is reached also increases. A steep threshold in the transmission/voltage characteristic of the display cell, however, does not tell anything about the speed of the optical effect which brings a display cell from a first state to a second state differing optically therefrom. In the known display device, a dye is added to the liquid crystal material and there is switched directly between two effective voltage levels, in which the low voltage results in the "off" state, that is the non-light-transmitting state, of the display cell, and the high voltage results in the "on" state, that is the light-transmitting state of the display cell. The transmission/voltage characteristic of such a display device shows hysteresis and in the driving method the voltages $V_1$ and $V_2$ must be chosen to be on each side of the hysteresis range. The advantage of the known display device is that the displayed information can be observed at a large viewing angle while an acceptable contrast is maintained. As confirmed in the article "Highly Multiplexable Dyed Liquid Crystal Displays" by Waters, Brimmell and Raynes in Proceedings of Japan Display Conference '83, Kobe, pp. 396–399, it is possible to achieve by means of standard r.m.s. driving techniques under ideal circumstances a multiplex ratio of at most 1:500 ($n_{max} = 500$). However, in this case the hysteresis effect in the transmission/voltage characteristic is the limiting factor with respect to the maximally possible number of lines which can be driven in time multiplex. The parameters of the liquid crystal, such as the elastic constants ($k_{11}$, $k_{22}$, $k_{33}$), influence the width of the hysteresis loop. This should be restricted there to a minimum in order to be able to realize a high multiplex ratio. Another critical factor is the uniformity of the distance d across the surface of the supporting plates, Small thickness variations across the display device reduce the multiplex ratio considerably. Furthermore, the ratio of distance/pitch d/p is adapted to the twist of the director across the layer thickness d. This means that the ratio d/p is equal to the ratio $\Phi/2\pi$, where $\Phi$ is the twist of the director in radians across the layer thickness d.

It is the object of the invention to provide a liquid crystal display device with which a number of lines, which according to present-day concepts is extremely great, can be driven while maintaining a high contrast at a large viewing angle.

According to the invention, a liquid crystal display device comprising two parallel supporting plates which are kept spaced at a distance d and have facing surfaces with a pattern of line electrodes being provided on one surface and a pattern of column electrodes being provided on the other surface in such manner that the line electrodes cross the column electrodes and the crossings form a matrix of picture cells, and have between the supporting plates a layer of nematic liquid crystal with a cholesteric addition with the liquid crystal having a positive dielectric anisotropy and a natural pitch p with the ratio d/p having a value between 0.5 and 1 and the surfaces comprising an orientation layer to provide a progressive molecular twist $\Phi$ of the liquid crystal molecules (director) across the layer thickness d of greater than $\pi$ and less than $2\pi$ radians, and gives the molecules at one surface an angle of tilt between 0° and 70° and those at the other surface an angle of tilt between 5° and 70° with respect to the surfaces in question, in which device upon applying an electric field the picture cells are in a first stable state below an effective electric field strength $E_1$, are in a second stable state differing optically herefrom above an effective field strength $E_2$, and at an effective field strength $E_H$ between $E_1$ and $E_2$ depending on the preceding stable state, may be either in the first stable state, or in the second stable state, is characterized in that the ratio d/p has a value between 0.6 and 0.9, the twist $\Phi$ of the director has a value between $1.2\pi$ and $1.7\pi$ with the values of d/p and 101 /$2\pi$ differing at most 10% from each other, and that the liquid crystal, starting from the first stable state and an effective field strength $E_H$ across the picture cells, shows a small energy threshold such that with a pulsatory field having an energy content above the energy threshold a picture cell changes from the first stable state into the second stable state, whereas with a pulsatory field having an energy content below said threshold energy, a picture cell returns to the first stable state via a metastable state having a certain relaxation period, on the condition that the recurrence frequency with which a picture cell is driven does not exceed the reciprocal value of the relaxation period.

In contrast with the known display devices in which the hysteresis in the transmission/voltage characteristic is experienced as disadvantageous, the invention uses this hysteresis and notably the fact that two stable states can coexist within the hysteresis range at one and the same voltage.

The invention is based on recognition of the fact that from the state in which an effective holding field $E_H$ is across the display cell, only a small energy threshold exists between the first and the second stable state. This energy threshold exists as a result of the rotation of the liquid crystal molecules required for transition between the states. In this manner, selected picture cells can be switched to the second state by a short-lasting pulse of sufficient energy content, in which state they will remain after returning to the holding field $E_H$. Non-selected picture cells to which a short-lasting pulse is applied having an energy content which is not sufficient to switch the picture cells over the threshold value to the second state, will lose the first state, it is true, but will return therein by themselves with a certain relaxation period. These non-selected cells therefore remain in the first state provided the relaxation process is not disturbed by a second pulse. If, in fact, the relaxation process is disturbed by second and subsequent pulses, then the non-selected cell will become remote farther and farther from the first state and finally is yet brought over the threshold value to the second state, which, of course, is not the intention. In order to prevent this, the recurrence frequency with which the picture cells are driven should not exceed the reciprocal value of the relaxation period. It has been found that the voltage pulses necessary to switch a picture cell from the holding voltage to the second state may be of a short duration and a comparatively low voltage.

It is to be noted that British patent application No. 2,117,157 discloses a liquid crystal display device the display cells of which can, depending on their preceding state also be switched to the "on" or the "off" state from a holding field. In this known display device the ratio d/p is approximately one and the twist $\Phi$ is approximately equal to $2\pi$. The minimum switching time (down-up) in this case is approximately 20 msec. This is in contrast with the present invention in which for d/p<0.9 in combination with $\Phi<1.7\pi$ considerably shorter switching times are realized. An embodiment of the invention which is particularly favourable in this respect is characterized in that the ratio d/p has a value between 0.7 and 0.8 and the twist $\Phi$ has a value between $1.4\pi$ and $1.6\pi$.

These findings and the physical recognitions in the operation and properties of the liquid crystal display device according to the invention form the basis of the idea that such a display device, with a correct choice of the driving method, is excellently suitable for realizing a display device with a large number of lines which can be driven in time multiplex.

A further embodiment of a display device according to the invention is characterized in that it comprises a line scanning circuit for successively and periodically scanning the line electrodes with a line selection pulse of voltage $V_l$, that it comprises column selection means for selecting those picture cells which are to be switched from the first stable state to the second stable state, which column selection means supply to each of the column electrodes a voltage pulse of the value $\pm V_c$ in such manner that of the picture cells which are connected to an instantaneously scanned line electrode, selected picture cells carry a voltage $V_l+V_c$ and non-selected picture cells carry a voltage $V_l-V_c$ while all other cells carry a voltage $\pm V_c$, which voltage pulses of the value $V_l+V_c$ have an energy content which exceeds the energy threshold, those of the value $V_l-V_c$ have an energy content lower than the energy threshold, and those of the value $V_c$ result in the effective field strength $E_H$ with the display device furthermore comprising means for supplying, prior to displaying new information, a blanking pulse to all picture cells in such manner that these are brought in the first stable state.

With such a method of driving, a display device according to the invention with more than 1,000 lines can be driven without any problems. With a suitable choice of the liquid crystal material and small tolerances in the manufacture of the display device, the number of lines can be increased to over 4,000. This method of driving does not permit picture cells which are in the "on" state, i.e. the second stable state, from being switched selectively to the "off" state, i.e. the first stable state. For this reason, a blanking pulse is applied to all picture cells with which these cells are brought in the first stable state. Of course this is necessary only at an instant a change has to be carried out in the displayed information.

The optical difference between picture cells in the "on" state and those in the "off" state consists of a difference in the light transmission of the cells. This is obtained by using dichroic dyes, polarisers or a combination thereof. As described in the European patent application 98070, a dichroic dye may be added to the liquid crystal material so that a display device of the Guest-Host type is obtained. If necessary, for increasing the contrast, a polariser may be provided on the front side, i.e. the side where the light enters the display device. It is furthermore possible to use the display device in the transmission mode or in the reflection mode. This is in combination or not in combination with a polariser provided on the front side. In the reflection mode a light-reflecting layer is present on the rear side of the display device. According to another embodiment the liquid crystal material does not comprise a dichroic dye, but the optical properties of the liquid-crystal material, for example birefraction ($\Delta n$) and the rotation of the plane of polarization coupled thereto, are used. In this case also, the display device may be operated optionally in the transmission mode or in the reflection mode. In the former case the display device is placed between two linear polarisers and the mutual spacing of the polarisers determines whether a selected display cell is displayed as a light cell or as a dark cell with respect to a non-selected display cell. In the latter case the display device comprises a polariser on the front side and a reflector on the rear side or an internal reflector on the inner surface of the rear supporting plate. It is also possible to use two polarisers of which the polariser placed on the rear side is reflecting. The mutual position of the polarisers then determines whether a selected display cell is displayed as light on a dark background or as dark on a light background. In the case of two linear polarisers there may be optimized on the desired colour contrast as a result of the birefracting properties of the liquid crystal material with the mutual position of the polarisers, that is the mutual angular rotation. With respect to a parallel or orthogonal position of the polarisers, deviations up to 45° from the polariser positions may be necessary depending on the product d·Δn for an optimum contrast. With an effect which is partially based on birefraction, contrast is also observed, of course, when one polariser is used in combination with a reflector.

The invention is excellently suitable for liquid crystal display devices having a high information content. This is because more than 2,000 lines can be written within a period of the order of magnitude of 1 second by means of the driving according to the invention which differs essentially from the conventional r.m.s. driving.

Figure 2:
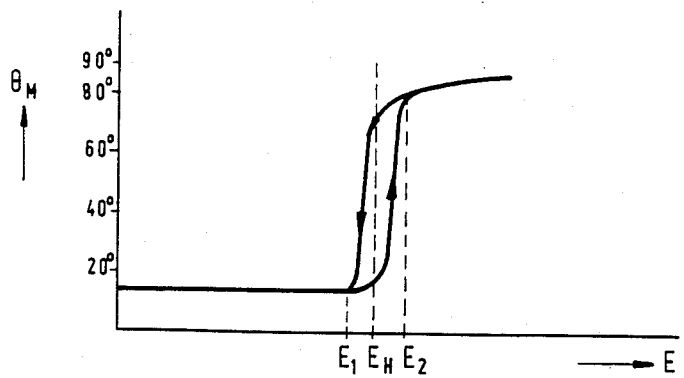
Figure 3:
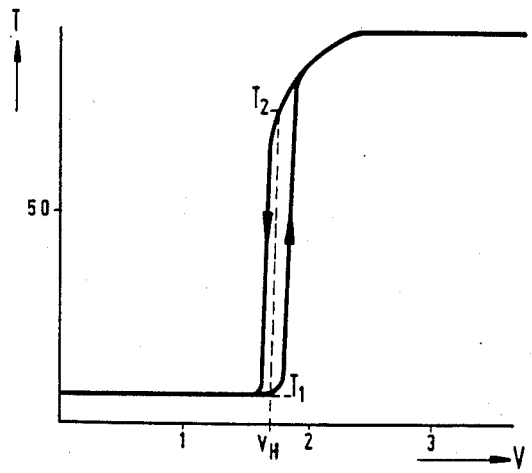
Figure 4A:
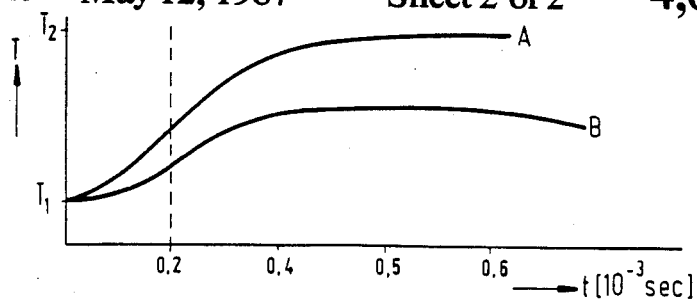
Figure 4B:
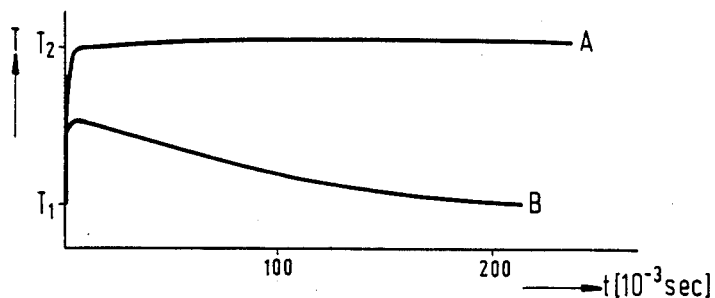
Figure 5:
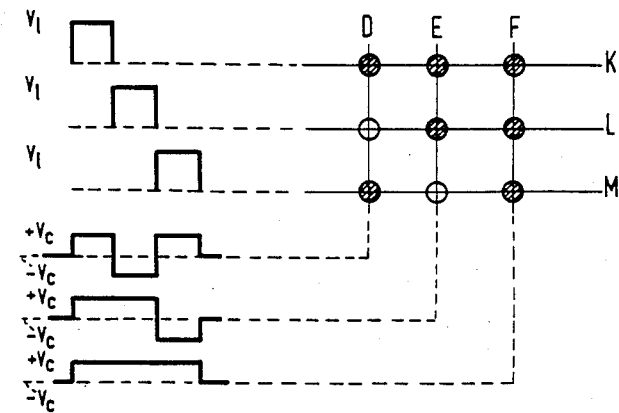

The invention will now be described, by way of example, with reference to the drawings, in which:

FIG. 1 is a sectional view of a display device according to the invention,

FIG. 2 illustrates the operating principle of a display device in accordance with the invention, FIG. 3 shows the transmission/voltage characteristic of the display device shown in FIG. 1, FIGS. 4a and 4b show the transmission response of a display cell as a result of a voltage pulse having an energy content above the energy threshold, as well as that as a result of a voltage pulse having an energy content below the energy threshold, and FIG. 5 illustrates the principle of the manner of driving a liquid crystal display device according to the invention.

The display device shown in FIG. 1 comprises two glass supporting plates 1 and 2. The supporting plate 1 comprises a pattern of strip-shaped electrodes 3 consisting of indium-tin oxide. The supporting plate 2 also comprises a pattern of strip-shaped electrodes 4 consisting of indium-tin oxide. The electrodes 3 cross the electrodes 4 and the crossings constitute the display cells which are arranged according to a matrix. A silicon layer is vapour-deposited over the surfaces of the supporting plates 1 and 2 comprising electrodes with the layer being deposited at an angle of 80°–86° to the normal on the surface. This layer constitutes the orientation layers 6 and 7. A liquid crystal material 8 consisting of a mixture of the nematic liquid crystal ZLI 1132 of Messrs. E. Merck and the cholesteric addition n-cyano-4'-(2-methyl)-isobutyl-biphenyl (CB 15) is present between the supporting plates. The spacing between the plates is 6.9 microns which is maintained by spacing means which are distributed regularly over the surfaces of the plates and are not shown in the drawing. A sealing edge 9 joins the plates together at their circumference. So much n-cyano-4'-(2-methyl)-isobutyl-biphenyl (obtainable under the name of CB 15 from Messrs. BHD-Chemicals) has been added to the nematic liquid crystal that the pitch p of the helix over which the liquid crystal molecules perform a rotation of $2\pi$ radians is approximately 9.2 microns. The ratio d/p therefore is approximately 0.75. The director at the orientation layer 6 is rotated with respect to the director of the layer 7 over an angle $\Phi$ equal to $3/2\pi$. As a result of the obliquely vapour-deposited silicon oxide layers, the directors are not parallel to the surface, but make an angle therewith, the so-called angle of tilt $\theta$, of approximately 30°. Although in the present example the twist $\Phi$ of the liquid crystal has been adapted to the wall conditions determined by the orientation layers, this is not a necessary condition. In other words, the ratio d/p need not be exactly equal to $\Phi/2\pi$. The supporting plates 1 and 2 furthermore each comprise a linear polariser, namely a polariser 10 and a polariser 11. The display cells can be switched from a first stable state to a second stable state differing optically therefrom by driving the electrodes 3 and 4 in a suitable manner. With a parallel position of polariser and analyser, a selected display cell will be white (light-transmitting) on a dark background. By rotating one of the polarisers with respect to the other and a suitable choice of the product d·Δn, contrasts from deep blue on white to pale yellow on black can optionally be realized by means of the device described.

The way in which switching between the optically mutually differing states can be carried out will now be described with reference to FIGS. 2 and 3.

FIG. 2 gives the tilt angle $\theta_m$ of the director halfway the cell thickness as a function of an electric field E applied across the cell. Below a field strength $E_1$ the director is substantially parallel to the supporting plates 1 and 2. Above a field strength $E_2$ the director is rotated over an angle of approximately 90°, which means that the director is substantially at right angles to the supporting plates 1 and 2. When the polarisers are parallel, the display cell assumes the first state below $E_1$ which in the given position of the polarisers is non-light-transmitting. This state represents the "off" state. Above a field strength $E_2$ the display cell assumes the second stable state which in the given position of the polarisers is light-transmitting. This state representes the "on" state. At a field strength between $E_1$ and $E_2$ the two states may occur simultaneously as a result of the hysteresis in the characteristic. The way in which this hysteresis is traversed at a field strength which first increases and then decreases is indicated in the characteristic by means of arrows. Coming from a high field strength, the "on" state will exist at the field strength $E_H$, whereas coming from a low field strength the "off" state will exist at the same field strength $E_H$. The invention uses this fact by the gained recognition that, starting from the first state and a retaining field $E_H$ across the cell, the latter can be switched to the second state by means of a pulsatory field of low energy content. With a holding field $E_H$, the angle $\theta_m$ in the "off" state and the "on" state is smaller than approximately 18° and higher than approximately 70°, respectively. In order to cause the director of the liquid crystal at this holding field to rotate from 18° to more than 70°, an energy threshold must be overcome. It has been found that when a pulsatory field (pulsatory voltage) is applied, only a small rotation need be bridged, after which the system changes to the second stable state by itself. This means that a short-lasting pulse of a low energy content will suffice to realize a rapid transition from the first to the second state. These states are indicated by $T_1$ and $T_2$ in FIG. 3, corresponding to the "off" and "on" states, respectively, of a cell. FIG. 3 is quite analogous to FIG. 2 and represents the transmission/voltage characteristic of the display cells. Both FIG. 2 and FIG. 3 show statically taken characteristics in which the holding voltage $V_H$ corresponds to the holding field $E_H$ and a high transmission T corresponds to a large angle of tilt $\theta_m$.

When a short-lasting pulse is applied to a display cell the energy content of which does not exceed the energy threshold, $\theta_m$ and hence the transmission T will initially increase for a moment and then will return to the initial value with a given relaxation period. The two effects described are shown in FIGS. 4a and 4b. Both Figures show the response of a display cell to a voltage pulse having a pulse duration of $0.2 \times 10^{-3}$ sec and a strength of 14 V with respect to the holding voltage $V_H$ which is approximately 1.6 Volts. The only difference between FIG. 4a and FIG. 4b is the time scale. Curve A shows the response of a selected display cell to which a voltage pulse of $0.2 \times 10^{-3}$ sec of the value (14+1.6) Volts has been applied. The voltage pulse turned out to be sufficient to exceed the energy threshold so that the display cell is brought from the optical state $T_1$ into the optical state $T_2$. Curve B shows the response of a non-selected display cell to which a voltage pulse of $0.2 \times 10^{-3}$ sec of the value (14−1.6) Volts has been applied. The energy threshold between the states $T_1$ and $T_2$ was not exceeded with this pulse. The transmission initially increases but returns to the initial state $T_1$ via the metastable phase with a given relaxation period which in this case is approximately $200 \times 10^{-3}$ sec. In order not to disturb this effect, a second pulse may not be applied to a non-selected cell during the relaxation period because, as appears from FIG. 4b, the energy threshold can then yet be exceeded. In order to prevent this, the recurrence frequency with which a display cell is driven may not exceed the reciprocal value of the relaxation period. In the present case this means a maximum recurrence frequency of approximately 5 Hz. This is what the present invention therefore distinguishes essentially from the standard r.m.s. driving.

FIG. 5 shows the principle of the driving of a display device according to the invention. Three line electrodes K, L and M, as well as three column electrodes D, E and F are shown. A line selection pulse of the value $V_l$ is applied successively to the line electrodes K, L, M, while voltage pulses of the value $\pm V_c$ are applied to all column electrodes. The voltages $\pm V_c$ correspond to the holding voltage $V_H$ of FIG. 3 and are approximately 1.6 Volts. The line selection pulses have a value of 14 Volts and a pulse duration of $0.2 \times 10^{-3}$ sec. Of the display cells which are connected to an instantaneously scanned line electrode, a voltage $V_l + V_c = 15.6$ Volts is presented to the selected cells and a voltage $V_l - V_c = 12.4$ Volts is presented to the non-selected cells. The remaining cells remain at the voltage of 1.6 volts. In the Figure the non-selected cells are shaded with respect to the selected cells.

In the case in which the display device is to display fresh information changed with respect to old information, first all cells are brought in the "off" state by means of a short pulse. A pulse of zero volt and a pulse duration of $50 \times 10^{-3}$ sec proves to be sufficient for this purpose.

Due to the short pulse duration of $0.2 \times 10^{-3}$ sec, 5,000 lines can be written in a period of 1 second. Deviations in the cell thickness of the display device up to 2.5% of the nominal cell thickness in the positive or negative sense have no detrimental effect on the operation of the display device. In the case of larger deviations it may occur that the selection criterion with respect to the driving voltages is no longer satisfied because the holding voltage $V_H$ is based on the nominal cell thickness. For cells having a deviating thickness, the holding voltages $V_H$ then becomes located in a different place in or with respect to the hysteresis (see FIG. 3).

The data of the embodiments described may be summarized as follows: Liquid crystal material ZLI 1132 with 1.45% of CB 15  d=6.9 microns; $\Phi=270°$; d/p=0.75; $\theta=30°$ on both surfaces and the holding voltage $V_H=1.6$ V.

Other embodiments which satisfy the object of the invention are:

(a) Liquid crystal material ZLI 1132+0.68% of CB 15 d=9 microns; $\Phi=270°$; d/p=0.5; $\theta=30°$ on both surfaces and the holding voltage $V_H=1.8$ V.

(b) Liquid crystal material ZLI 1132+1.16% of CB 15 d=6.4 microns; $\Phi=270°$; d/p=0.6; $\theta_1=1°$ and $\theta_2=30°$; holding voltage $V_H=2.3$ V.

(c) Liquid crystal material ZLI 1132+1.16% of CB 15 d=6.4 microns; $\Phi=247°$; d/p=0.6; $\theta=30°$ on both surfaces; $V_H=1.6$ V.

(d) Liquid crystal material E 1840+1.45% of CB 15 d=6.4 microns; $\Phi=270°$; d/p=0.75; $\theta=30°$ on both surfaces; $V_H=1.6$ V.

What is claimed is:

1. A liquid crystal display device comprising
   two parallel supporting plates spaced at a distance d with facing surfaces;
   a pattern of row electrodes on a facing surface of one of said plates, and a pattern of column electrodes on an opposing facing surface of the other of said plates, said row electrodes crossing said column electrodes to form a matrix of picture cells at the crossings;
   a layer of nematic liquid crystal having a cholesteric addition disposed between said supporting plates, said liquid crystal having a positive dielectric anisotropy and a natural pitch p, said distance d and said pitch p forming a ratio d/p having a value between 0.6 and 0.9; and
   an orientation layer disposed on said facing surfaces and said electrodes, said orientation layer providing the molecules of said liquid crystal at one facing surface with an angle of tilt of between 0° and 70° and providing an angle of tilt of between 5° and 70° at said opposing facing surface, and said orientation layer providing a progressive molecular twist $\Phi$ across said distance d by the director of said liquid crystal molecules, said twist $\Phi$ having a value between $1.2\pi$ radians and $1.7\pi$ radians, wherein said value of d/p differs from the value of $\Phi/2\pi$ by 10%;
   wherein an electric field applied to said liquid crystal includes picture cells below an effective electric field strength $E_1$ being in a first stable state, picture cells above an effective field strength $E_2$ being in a second stable state differing optically from said first state, and picture cells at an effective field strength $E_H$ between $E_1$ and $E_2$ being either in said first stable state or said second stable state depending on the preceding stable state;
   wherein, starting from said first stable state and said effective field strength $E_H$ across said picture cells, said liquid crystal exhibits a small energy threshold to change a picture cell from said first stable state into said second stable state with a pulsatory field having an energy content above said energy threshold, and
   wherein with said pulsatory field having an energy content below said energy threshold, a picture cell returns to said first stable state by a metastable state having a given relaxation period if the recurrence frequency at which a picture cell is driven does not exceed the reciprocal value of said relaxation period.

2. A liquid crystal display device according to claim 1, wherein said ratio d/p has a value between 0.7 and 0.8, and said twist $\Phi$ has a value between $1.4\pi$ and $1.6\pi$.

3. A liquid crystal display device according to claim 1 or claim 2, wherein a line scanning circuit for successively and periodically scanning said row electrodes with a row selection pulse of voltage $V_e$, and column selection means for selecting picture cells to be switched from said first stable state to said second stable state are included, said column selection means supplying a voltage pulse $\pm V_c$ to each column electrode, wherein for picture cells connected to an instantaneously scanned row electrode, selected picture cells carry a voltage $V_l + V_c$, non-selected picture cells carry a voltage $V_l - V_c$, and all other picture cells carry a voltage $\pm V_c$, said voltage $V_l + V_c$ being provided in voltage pulses with an energy content exceeding said energy threshold, said voltage $V_l - V_c$ being provided in voltage pulses with an energy content below said energy threshold, and said voltage $V_c$ being provided in voltage pulses of said effective field strength $E_H$, and wherein means for supplying a blanking pulse to all picture cells to restore said first stable state before displaying new information are provided.

4. A liquid crystal display device according to claim 3, wherein dichroic dye is disposed in said liquid crystal.

5. A liquid crystal display device according to claim 4, wherein a polarizer is provided at a first of said two supporting plates.

6. A liquid crystal display device according to claim 5, wherein a reflecting layer is provided at a second of said two supporting plates.

7. A liquid crystal display device according to claim 3, wherein a polarizer is provided at a first of said two supporting plates.

8. A liquid crystal display device according to claim 7, wherein a reflecting layer is provided at a second of said two supporting plates.

9. A liquid crystal display device according to claim 3, wherein a polarizer is provided on each said two supporting plates.

10. A liquid crystal display according to claim 9, wherein a reflecting layer is provided on only one of said two supporting plates.

11. A liquid crystal display device according to claim 1 or claim 2, wherein dichroic dye is disposed in said liquid crystal.

12. A liquid crystal display device according to claim 11, wherein a polarizer is provided at a first of said two supporting plates.

13. A liquid crystal display device according to claim 12, wherein a reflecting layer is provided at a second of said two supporting plates.

14. A liquid crystal display device according to claim 1 or claim 2, wherein a polarizer is provided at a first of said two supporting plates.

15. A liquid crystal display device according to claim 14, wherein a reflecting layer is provided at a second of said two supporting plates.

16. A liquid crystal display device according to claim 1 or claim 2, wherein a polarizer is provided on each said two supporting plates.

17. A liquid crystal display according to claim 16, wherein a reflecting layer is provided on only one of said two supporting plates.

* * * * *

UNITED STATES PATENT AND TRADEMARK OFFICE
CERTIFICATE OF CORRECTION

PATENT NO. : 4,664,483

DATED : May 12, 1987

INVENTOR(S) : Hendrik A. Van Sprang et al

It is certified that error appears in the above-identified patent and that said Letters Patent is hereby corrected as shown below:

Column 2, line 58  change "$10/2\pi$ to $--\phi/2\pi$

Signed and Sealed this

Twentieth Day of September, 1988

Attest:

DONALD J. QUIGG

*Attesting Officer*  *Commissioner of Patents and Trademarks*